(12) United States Patent
Miura

(10) Patent No.: US 8,397,160 B2
(45) Date of Patent: Mar. 12, 2013

(54) SYSTEM AND PROGRAM FOR DISPLAYING DEVICE INFORMATION USING BROWSER

(75) Inventor: Yuki Miura, Tokyo (JP)

(73) Assignee: Access Co., Ltd. (JP)

( * ) Notice: Subject to any disclaimer, the term of this patent is extended or adjusted under 35 U.S.C. 154(b) by 650 days.

(21) Appl. No.: 10/575,174

(22) PCT Filed: Oct. 6, 2004

(86) PCT No.: PCT/JP2004/014736
§ 371 (c)(1),
(2), (4) Date: Apr. 7, 2006

(87) PCT Pub. No.: WO2005/036381
PCT Pub. Date: Apr. 21, 2005

(65) Prior Publication Data
US 2007/0121145 A1    May 31, 2007

(30) Foreign Application Priority Data
Oct. 10, 2003    (JP) ................................ 2003-352080

(51) Int. Cl.
*G06N 3/00* (2006.01)
(52) U.S. Cl. ...................................................... 715/243
(58) Field of Classification Search .................. 715/234, 715/243, 254, 244, 255
See application file for complete search history.

(56) References Cited

U.S. PATENT DOCUMENTS

| | | | | |
|---|---|---|---|---|
| 7,165,109 B2 * | 1/2007 | Chiloyan et al. | ............. | 709/227 |
| 7,197,702 B2 * | 3/2007 | Niyogi et al. | ................. | 715/234 |
| 2002/0095310 A1 * | 7/2002 | Kobayashi et al. | ............... | 705/1 |
| 2004/0163090 A1 * | 8/2004 | Ledru et al. | .................... | 719/320 |
| 2005/0050454 A1 * | 3/2005 | Jennery et al. | ................ | 715/513 |
| 2005/0091224 A1 * | 4/2005 | Fisher et al. | ................... | 707/100 |

FOREIGN PATENT DOCUMENTS

| | | |
|---|---|---|
| EP | 1286260 A | 2/2003 |
| GB | 2329309 A | 3/1999 |
| GB | 2371385 A | 7/2002 |
| JP | 2001-249784 | 9/2001 |
| JP | 2001-273221 | 10/2001 |
| JP | 2002-229765 | 8/2002 |

OTHER PUBLICATIONS

European Search Report mailed Dec. 3, 2007, for EP Application No. 04792092.1 filed Oct. 16, 2004, 3 pages.
International Search Report mailed Jan. 18, 2005, for PCT Patent Application PCT/JP2004/014736, filed on Oct. 6, 2004, 2 pages.

* cited by examiner

*Primary Examiner* — Kyle Stork
(74) *Attorney, Agent, or Firm* — Morrison & Foerster LLP

(57) ABSTRACT

A device information displaying system for displaying device internal information of one or more information devices includes: information browser means which acquires and analyzes document data described in a markup language, converts the acquired document data into layout data having a prescribed structure based on result of the analysis, and makes a display based on the layout data; and device information providing means which acquires the device internal information of the one or more information devices, generates display data containing the device internal information and having a structure equivalent to the prescribed structure of the layout data generated by the information browser means, and displays the generated display data through the information browser means.

19 Claims, 4 Drawing Sheets

SYSTEM AND PROGRAM FOR DISPLAYING DEVICE INFORMATION USING BROWSER

CROSS REFERENCE TO RELATED APPLICATIONS

This application is a 35 U.S.C. §371 National Stage filing of International Patent Application No. PCT/JP2004/014736, titled SYSTEM AND PROGRAM FOR DISPLAYING DEVICE INFORMATION USING BROWSER, filed Oct. 6, 2004, which claims the benefit of Japanese Application No. 2003-352080, titled SYSTEM AND PROGRAM FOR DISPLAYING DEVICE INFORMATION USING BROWSER, filed Oct. 10, 2003, both of which are incorporated herein by reference in their entireties.

TECHNICAL FIELD

The present invention relates to a function of presenting device internal information in an information device, such as a cellular phone and a home information appliance, and in particular, to the use of a function of information browsing software for such an information presentation function.

BACKGROUND OF THE INVENTION

Information devices like cellular phones and home information appliances are generally required to have an interface for displaying lists of a variety of device internal information such as files and folders inside the device and internal functions of the device, or for performing various operations to such internal functions. Software for implementing such a function (hereinafter referred to as an "information presentation function") is generally being developed today as special-purpose software for the exclusive use of each information device.

A multi-function device configured to enable a client device to browse a status of the multi-function device on a Web browser of the client device has been described in Japanese Patent Publication No. 3313359. The multi-function device generates its status as a Web page and publishes the Web page by use of a Web server formed therein.

DISCLOSURE OF THE INVENTION

Problems to be Solved by the Invention

Such an information presentation function is desired to be implementable with minimum consumption of hardware resources (resources) such as memory capacity and disk capacity. The request becomes more serious with information devices with relatively restricted resources (e.g. cellular phones).

Incidentally, some of such information devices are designed to be used in network environment and equipped with information browsing software (called a "browser") capable of acquiring information from a network such as the Internet. The browser has the function of making access to a Web server according to a prescribed protocol, along with a function as a user interface for presenting acquired information to the user and receiving operations from the user.

In order to reduce the resource consumption caused by the information presentation function by use of the browser, it is generally possible to convert the device internal information acquired from the information device into an HTML (Hyper-Text Markup Language) document and hand over the HTML document to the browser, that is, to convert the device internal information into text and display the text using the browser. By employing such a method, the information presentation function of an information device can be realized by use of a browser. Specifically, the function as the user interface for presenting acquired information to the user, included in the information presentation function, can be realized by use of the browser.

However, the above method involves a process overhead for converting the acquired device internal information into text.

The present invention has been made in consideration of the above problems. It is therefore the primary object of the present invention to provide an information device and a program capable of realizing an information presentation function that minimizes the process overhead and the resource consumption while utilizing a function of the browser.

Means for Solving the Problems

In order to achieve the above object, an aspect of the present invention provides a device information displaying system for displaying device internal information of one or more information devices, comprising: information browser means which acquires and analyzes document data described in a markup language, converts the acquired document data into layout data having a prescribed structure based on result of the analysis, and makes a display based on the layout data; and device information providing means which acquires the device internal information of the one or more information devices, generates display data containing the device internal information and having a structure equivalent to the prescribed structure of the layout data generated by the information browser means, and displays the generated display data through the information browser means.

Since the acquired device internal information is generated as layout data having a structure that can be displayed by the information browser means, no special displaying function becomes necessary for the displaying of the device internal information, that is, the device internal information can be displayed by use of the existing function of displaying a markup language.

In this case, the device information providing means may be configured to have stylized data corresponding to the type of the information device to be used as a base of the display data. The stylized data may be prepared in multiple types corresponding to the types of the information devices.

The device information providing means may further have a function of writing operation information, including at least one of setting information and a control instruction, into the one or more information devices.

The device information providing means may include a device information interface which functions as an interface for receiving a request signal according to a prescribed procedure and executing the acquisition of the device internal information from the one or more information devices and the writing of the operation information according to the request signal.

In cases where the information browser means and the device information providing means are implemented in one information device, the device information interface may be configured to acquire the device internal information of the one information device.

In cases where the device information interface is connected to the one or more information devices via a wired and/or wireless network, the device information interface may be configured to acquire the device internal information from the one or more information devices via the network.

In order to achieve the above object, another aspect of the present invention provides a program letting a computer function as: information browser means which acquires and analyzes document data described in a markup language, converts the acquired document data into layout data having a prescribed structure based on result of the analysis, and makes a display based on the layout data; and device information providing means which acquires device internal information of one or more information devices, generates display data containing the device internal information of the one or more information devices and having a structure equivalent to the prescribed structure of the layout data generated by the information browser means, and displays the generated display data through the information browser means.

Since the acquired device internal information is generated as layout data having a structure that can be displayed by the information browser means, no special displaying function becomes necessary for the displaying of the device internal information, that is, the device internal information can be displayed by use of the existing function of displaying a markup language.

In the program configured as above, the device information providing means may be configured to have stylized data corresponding to the type of the information device to be used as a base of the display data. The stylized data may be prepared in multiple types corresponding to the types of the information devices.

The device information providing means may further have a function of writing operation information, including at least one of setting information and a control instruction, into the one or more information devices.

The device information providing means may include a program interface which receives a request according to a prescribed procedure and executes the acquisition of the device internal information from the one or more information devices and the writing of the operation information according to the request.

In cases where the information browser means and the device information providing means are implemented in one information device, the program interface may be configured to acquire the device internal information of the one information device.

In cases where the program interface is connected to the one or more information devices via a wired and/or wireless network enabling communication, the program interface may be configured to acquire the device internal information from the one or more information devices via the network.

In the device information displaying systems and programs configured as above, the one or more information devices may include at least one of a cellular phone, a home information appliance and a vehicle-mounted device. The device internal information may include at least one of information on the types of the information devices and information on peripheral devices of each of the one or more information devices.

In order to achieve the above object, another aspect of the present invention provides an information browser program having a function of making access to a Web server according to a prescribed protocol, along with an analysis function of acquiring and analyzing document data described in a markup language, a conversion function of converting the acquired document data into layout data having a prescribed structure based on result of the analysis, and a display function of making a display based on the layout data. The information browser program further has a device information providing function of acquiring device internal information of one or more information devices according to a prescribed program interface, converting the acquired device internal information into display data having a structure equivalent to the prescribed structure of the layout data, and displaying the generated display data through the display function.

Since the acquired device internal information is generated as layout data in an internal format that can be used by the information browser program (browser), no special displaying function becomes necessary for the displaying of the device internal information. Therefore, an information browser program capable of displaying the device internal information can be realized by use of the existing function of displaying a markup language.

DESCRIPTION OF REFERENCE CHARACTERS

3 CPU
5 ROM
7 RAM
9 network interface
13 display
17 user interface device

BEST MODE FOR CARRYING OUT THE INVENTION

Figure 1:
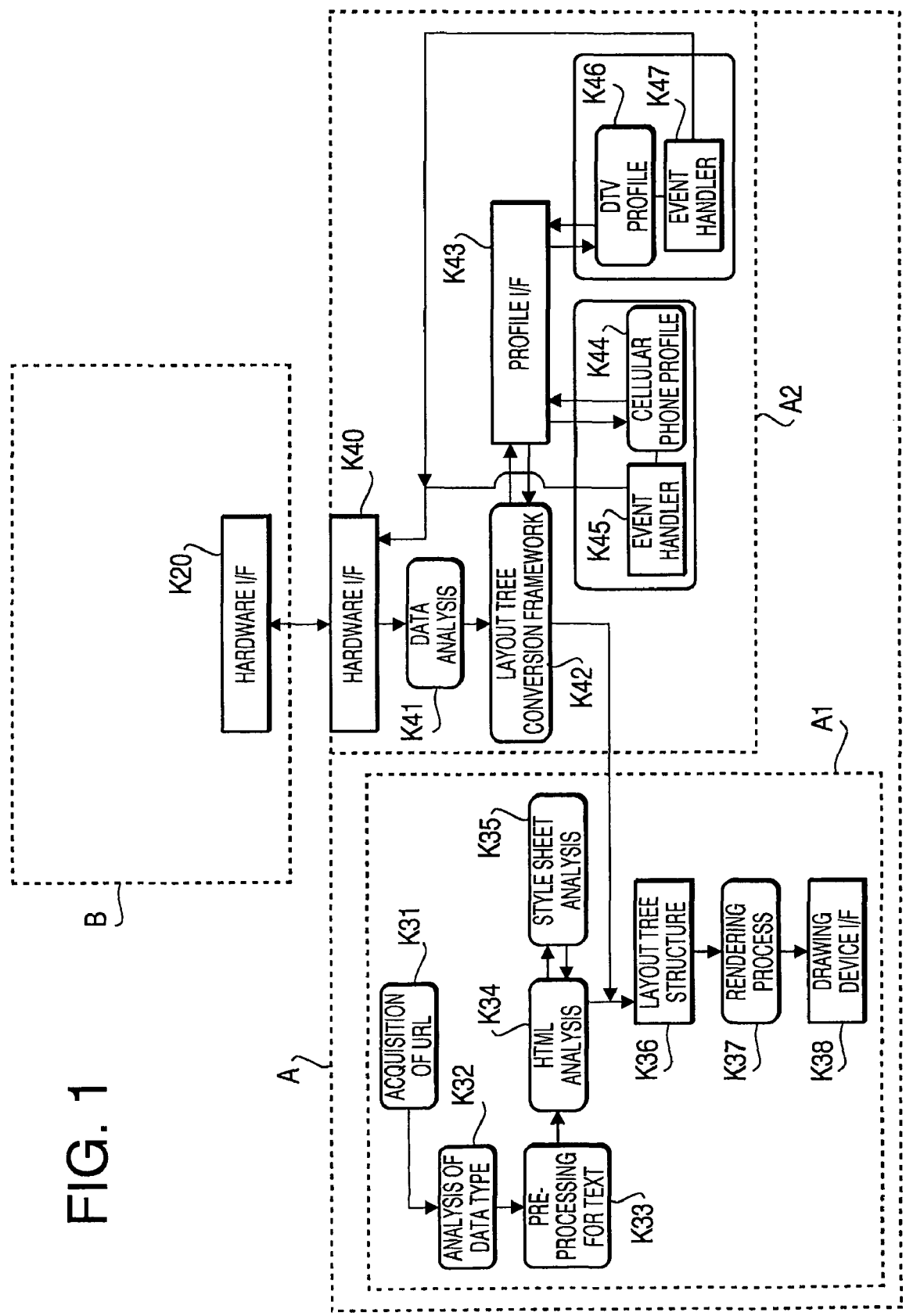
FIG. 1 is a functional block diagram showing an information presentation function which is implemented in an information device.

FIG. 1 is a functional block diagram for explaining an information presentation function which is implemented in an information device. Incidentally, the "information device" in this embodiment means an information device which is generally called an "embedded device", such as a cellular phone or a home information appliance. "Device internal information" in this embodiment means a variety of information that can be acquired from hardware of the information device, such as files and folders managed by a file system of the information device, preset temperature information (if the information device is an air conditioner), etc.

In FIG. 1, a block A surrounded by a broken line represents functions of a browser. A block A1 surrounded by a broken line inside the browser A represents known functions of the browser. Meanwhile, a block A2 surrounded by a broken line inside the browser A represents functions as a characteristic part of the present invention, for realizing a function of presenting the device internal information via the browser functions. Therefore, the function of presenting the device internal information is constructed as part of the browser functions in this embodiment.

A block B surrounded by a broken line in FIG. 1 represents functions as an application program. The application program (block B) provides a hardware interface (I/F) function which will be explained in detail later.

Figure 2:
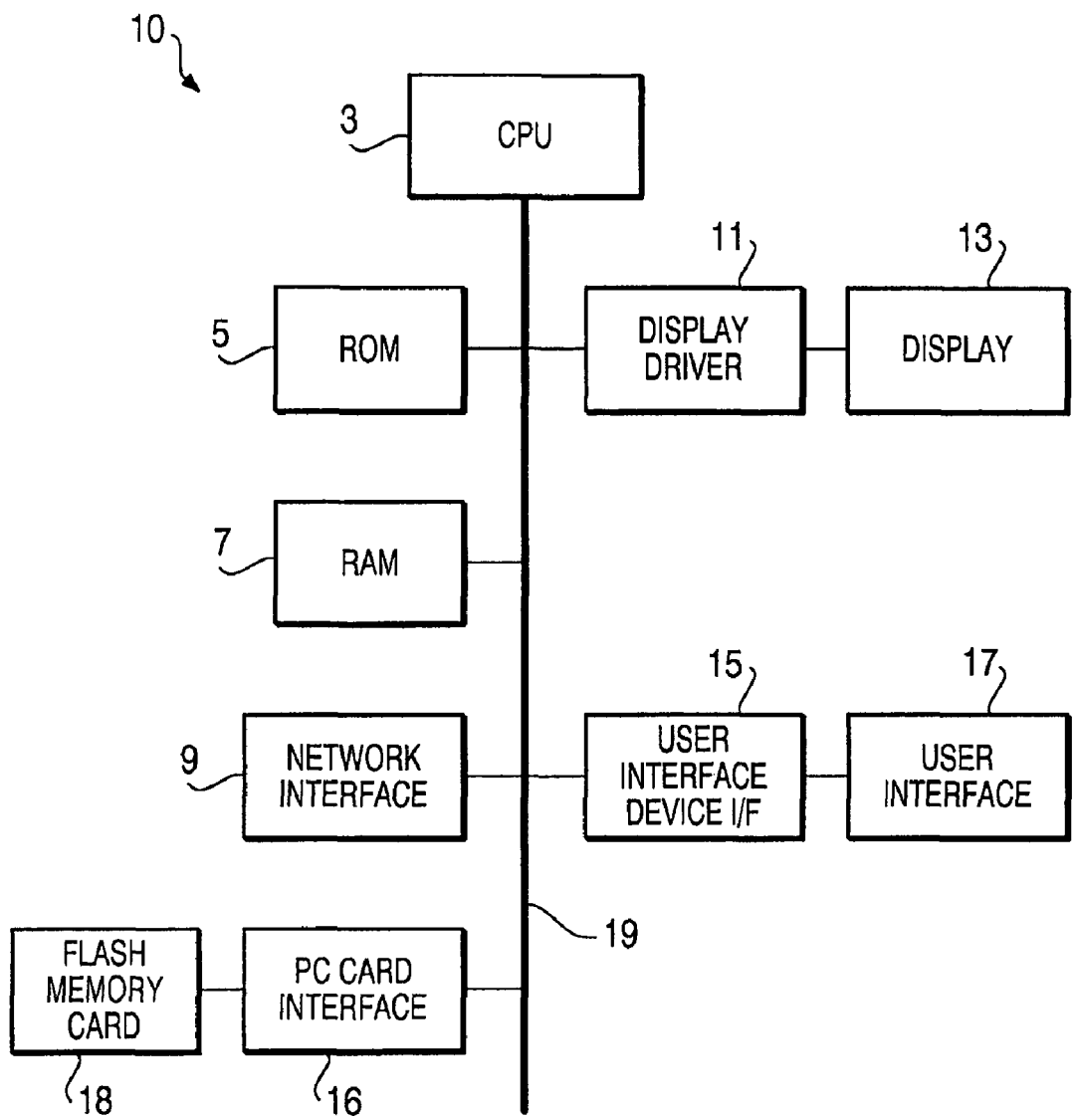
FIG. 2 is a block diagram showing an example of a hardware configuration of the information device.

FIG. 2 is a block diagram showing an example of a hardware configuration of the information device. FIG. 2 shows a case where the information device is a cellular phone. As shown in FIG. 2, in the information device 10 a CPU 3 for controlling the whole information device 10, a ROM 5, a RAM 7, a network interface 9, a display driver 11, a user interface device I/F 15 and a PC card interface 16 (as an interface with various PC cards) are connected together by a bus 19. The ROM 5 stores various programs for the operation of the information device 10, such as an operating system, the browser (block A) and the application (block B). The CPU 3 is further connected with a display 13 and a user interface device 17 via the display driver 11 and the user interface device I/F 15, respectively. The user interface device 17 includes operation keys, for example.

Various PC cards can be attached to the information device 10 via the PC card interface 16. In this example, a flash memory card 18 is assumed to be used as a PC card. The browser (block A) is activated when a prescribed operation is performed by the user through the user interface device 17. The browser (block A) and the application (block B) are executed by the CPU 3.

First, the known functional part of the browser (block A1) will be explained below. When a URL (Uniform Resource Locator) is specified by the user by operating the user interface device 17, the browser acquires data from the specified URL (K31). Specifically, the browser acquires data from a Web server on a network. Subsequently, the browser analyzes the type of the acquired data (K32) and executes a prescribed process as a preparation for HTML document analysis (text preprocessing: K33).

Subsequently, the browser executes the HTML document analysis including parsing (K34). Incidentally, the HTML document analysis is executed in collaboration with style sheet analysis (K35) which is executed for analyzing a "style sheet" (a language called "CSS" (Cascading Style Sheets) for describing styles of HTML documents). By the HTML document analysis, a layout tree is generated (K36). The layout tree obtained here is a form or structure containing layout information generated as a result of the analysis of the HTML document and the style sheet. The layout tree can be placed as language-independent layout information.

Figure 3:
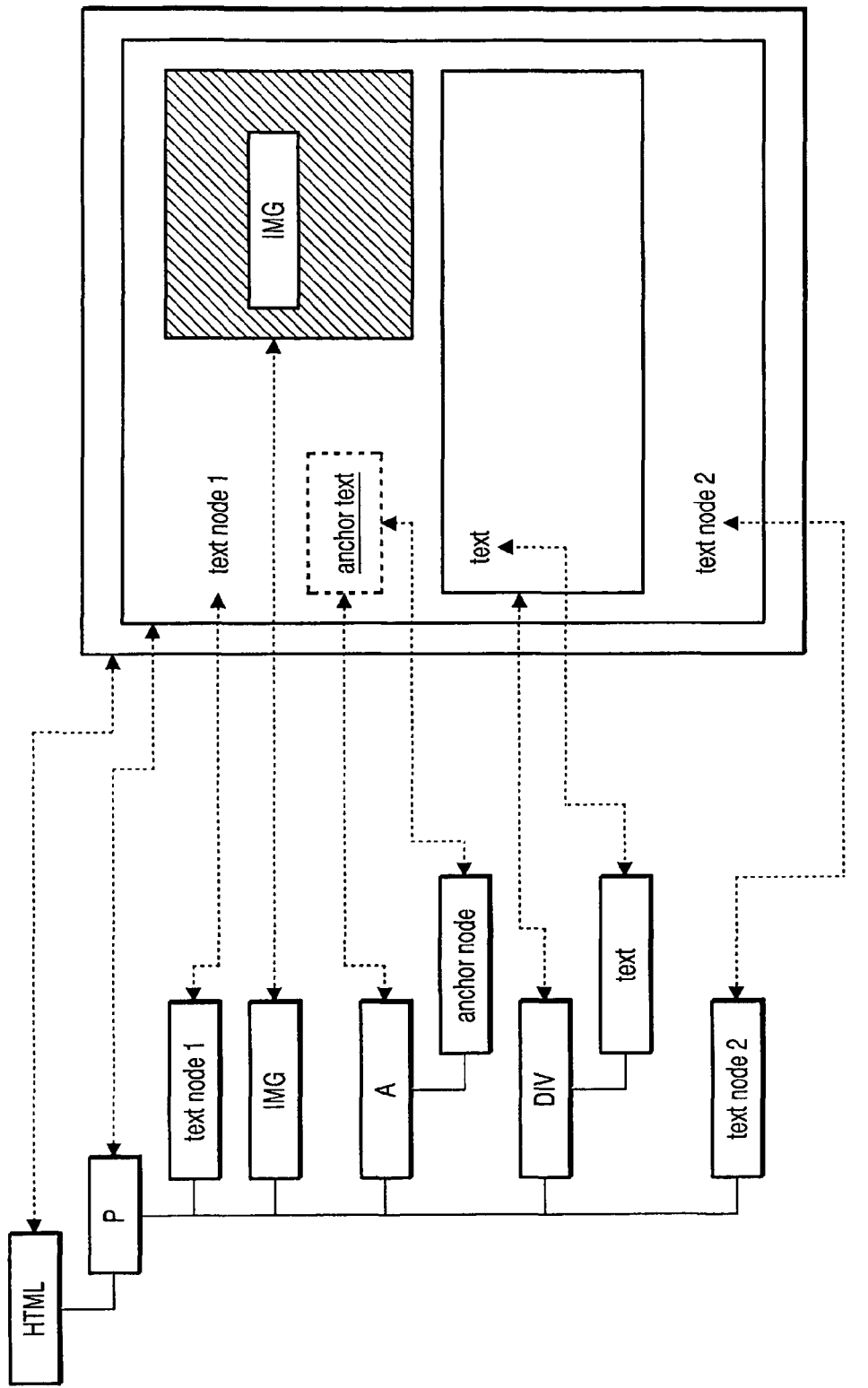
FIG. 3 is a schematic diagram showing an example of a layout tree structure which is generated by a browser shown in FIG. 1.

FIG. 3 shows an example of a layout tree structure. A tree structure is shown on the left-hand side of FIG. 3. In this tree structure, the HTML document includes a text part "text node 1", an image (IMG) tag, an A (Anchor) tag (link name: anchor text), a DIV (DIVision) tag (text part: "text") and a text part "text node 2" which are placed below a P tag. On the right-hand side of FIG. 3, a layout status corresponding to the tree structure is shown. In short, the tree structure is data including a variety of layout information (placement coordinates, size, color, etc.) on each of such drawing objects, representing a layout status like the one shown on the right-hand side of FIG. 3 regarding each of the drawing objects. In FIG. 3, each element of the tree structure (each element on the left-hand side of FIG. 3) is connected with a corresponding placement status of itself by a broken line with arrows on both sides.

After the layout tree is generated by the layout tree structure generating function (K36), a rendering process (K37) using the drawing function of the OS (Operating System) is executed, and display data as the result of the rendering process is displayed on the display 13 via a drawing device interface (K38).

The functions of the known part of the browser are as described above. Meanwhile, the browser is further provided with the information presentation function A2 which is a function of acquiring and presenting the device internal information, as shown in FIG. 1. The information presentation function A2 receives the device internal information from a hardware I/F (K20) implemented on the application side, via a hardware I/F (K40).

The hardware I/F (K20) on the application side acquires the device internal information from the hardware of the information device 10 directly (or via software that is close to the hardware layer, such as the OS and a device driver) in response to a request from the hardware I/F (K40) on the browser side. An example of program interface specifications for the communication of the device internal information between the hardware I/F (K20) and the hardware I/F (K40) (that is, between the application and the browser) will be described below.

The following is an example of the program interface specifications.

<Interface Specifications>
1. Functions
   The following four functions are provided by the interface.
   1) Acquisition of Supported Profiles (Types of Information Devices)
   2) Acquisition of the Number of Peripheral Devices
   3) Acquisition of Device List
   4) Acquisition of Detailed Information on Devices
2. Details of Functions
   1) Acquisition of Supported Profiles
   Argument: None
   Return Value: Profile IDs (enumerated data type)
   Explanation: An ID of a hardware profile supported by each platform (information device) is returned.
   The "profile" defines a group of platforms (information devices) to which a relatively common process can be applied. Therefore, for platforms belonging to a certain profile, it is possible to execute a process while assuming that the platforms have common peripheral devices and functions defined by the profile.
   2) Acquisition of the Number of Peripheral Devices
   Argument: None
   Return Value: The number of devices (numerical value)
   Explanation: The number of peripheral devices supporting the information acquisition is returned. The peripheral devices include, for example, a back light, a battery, an antenna and a memory when the information device is a cellular phone.
   3) Acquisition of Device List
   Argument: A pointer to the structure storing basic information on devices (pointer to basic information)
   Return Value: The number of acquired items (numerical value)
   Explanation: A list of basic information on devices is acquired.
   The basic information includes, for example, IDs (numerical values), device types (enumerated data type) and device names (character strings).
   4) Acquisition of Detailed Information on Devices
   Argument: IDs (numerical values) of devices from which information is acquired
   A pointer to the structure storing detailed information on the devices
   Return Value: Error code
   Explanation: Detailed information on particular devices is acquired.
   The IDs in the basic information acquired by the "Acquisition of Device List" are used for the IDs as the arguments.
   The size of the structure of the detailed information varies depending on the device type.

If the device is, for example, a battery, the detailed information includes:
    the percentage of the remaining battery life (numerical value); and
    the presence/absence of exhaustion (true/false value).
If the device is a built-in memory, the detailed information includes:
    total capacity (numerical value);
    remaining capacity (numerical value);
    quantity consumed (numerical value),
    the number of files (numerical value); and
    the presence/absence of error.

Defining the program interface for the acquisition of the device internal information of the information device as above has the following advantages:

On the application side (block B), the design of software is only required to simply supply the device internal information according to the above program interface specifications, irrespective of the type of the information device.

On the browser side (block A), data communication with an information device is possible via the unified program interface, irrespective of the type of the information device.

Referring again to FIG. 2, when a prescribed operation is performed by the user, a data analysis (K41) acquires the device internal information from the information device 10 via the hardware I/F (K40) (i.e. according to the above program interface), and holds the device internal information in memory (RAM 7) in a prescribed format.

A layout tree conversion framework (K42) executes a process for converting the acquired device internal information into a layout tree. Incidentally, of the processes for layout tree conversion of the device internal information, a process that is common to all the profiles (all the types of information devices) is executed in the layout tree conversion framework (K42). A layout tree conversion process specifically for a particular profile (particular type of information device) is executed via a profile I/F (K43) by extracting stylized data (template). For a cellular phone, for example, a template that has been prepared as a cellular phone profile (K44) is extracted and used for generating the layout tree. If the information device 10 is a digital TV (DTV), a DTV profile (K46) is used. A common template can be used for each profile since information stored as the device internal information is substantially common among cellular phones, for example, irrespective of cellular phone makers.

Figure 4:
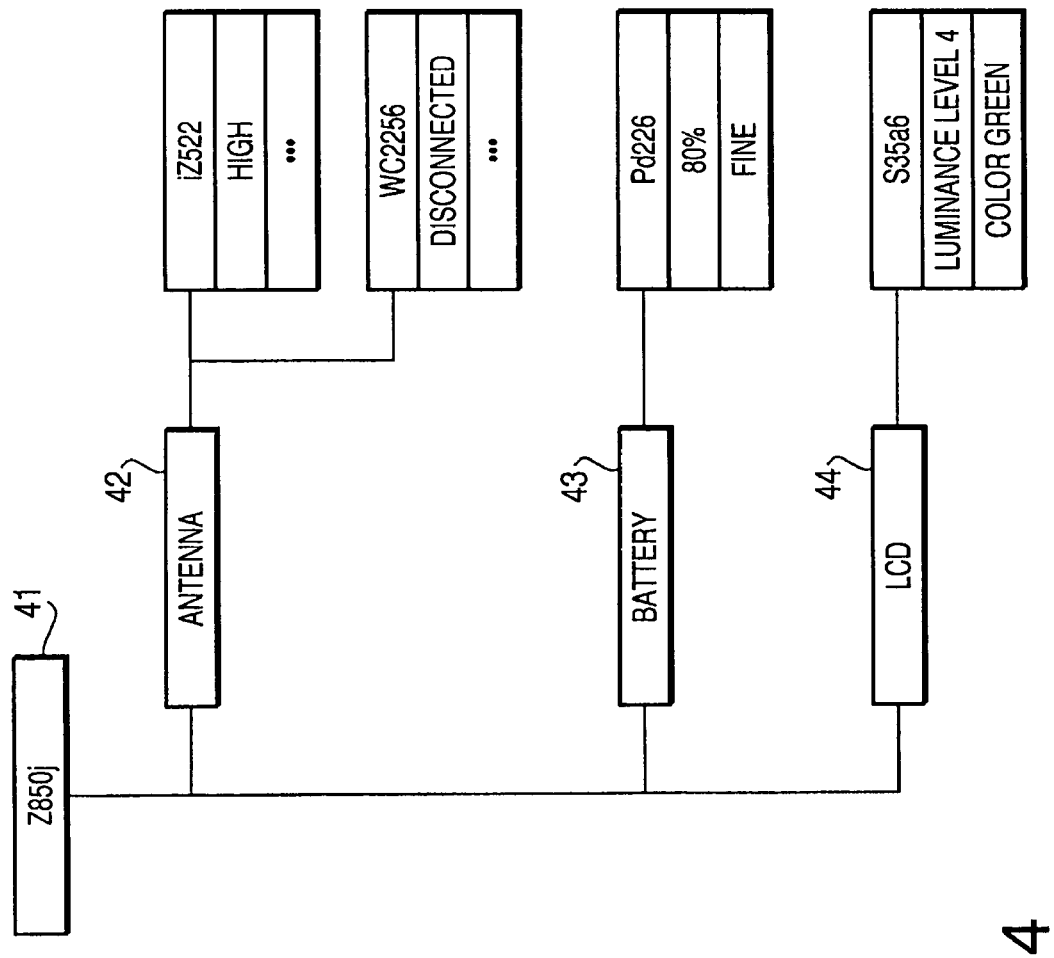
FIG. 4 is a schematic diagram showing an example of a tree structure in a case where acquired device internal information is held by a data analysis function shown in FIG. 1.

The data analysis (K41) is capable of holding data in a tree structure like the one shown in FIG. 4 if the following device internal information is acquired by the data analysis (K41):
(Example of Device Internal Information)
Information device (Profile): Cellular Phone (model name: Z850j)
Peripheral Device:
    Antenna 1 (model name: iZ522)
    Antenna 2 (model name: WC2256)
    Battery (model name: pd266)
    LCD (model name: S35a6)
Detailed Information:
    Status of Antenna 1: high reception level
    Status of Antenna 2: disconnected
    Remaining Battery Life: 80%
    Battery Status: fine
    LCD Luminance: luminance level 4
    LCD Color: green In FIG. 4, corresponding to the above mentioned device internal information, the model name of the cellular phone (with a reference numeral 41) is placed at the top layer of the tree structure, and the antennas (with a reference numeral 42), the battery (with a reference numeral 43) and the LCD (with a reference numeral 44) and their detailed information are placed in layers below the top layer.

Display data of the device internal information, which has been generated as the layout tree structure by the layout tree conversion framework (K42), is thereafter displayed on the display 13 via the rendering process (K37), similarly to the layout tree that is generated by the browser (A1).

The above explanation of the information presentation function (A2) is about the acquisition and displaying of the device internal information. Meanwhile, the information presentation function (A2) is configured to be also capable of writing information into the information device 10 via the hardware I/F (K40) and the hardware I/F (K20) (i.e. according to the above program interface) when an item of device internal information displayed on the display screen by the above function is selected by the user, for example.

Such an information writing function can be realized by adding the following functions to the above program interface, for example.
<Example of Additional Functions of Program Interface>
    5) Rewriting of Setting Information of Device
    6) Issuance of Control Instruction to Device In regard to the information presentation function (A2), it is only necessary to configure the information presentation function (A2) so that an event handler (K45) corresponding to the cellular phone profile (K44) will be activated when the cellular phone profile is used, for example, as shown in FIG. 1. When the DTV profile (K46) is used, an event handler (K47) corresponding to the DTV profile (K46) may be activated. Incidentally, each event handler, being only required to start up along with the use of each profile, can be implemented by use of various languages such as the C language. It is unnecessary to implement each event handler in a script language like the Java® script. This is advantageous from the viewpoint of processing speed.

Incidentally, while only the cellular phone and DTV are shown in FIG. 1 as examples of profiles, various other profiles (refrigerator, vehicle-mounted device, etc.) are also possible.

As described above, by the embodiment of the present invention, the acquired device internal information is generated as layout data having structure that can be displayed by the information browser means. Therefore, no special displaying function becomes necessary for the displaying of the device internal information, that is, the device internal information can be displayed by use of the existing function of displaying a markup language.

Incidentally, if an interface for the acquisition of the device internal information from an information device, etc. has been prescribed, interoperation can be facilitated especially when the information device (peripheral device) exists outside, that is, when the peripheral device is connected to the device information displaying system according to the present invention via a network.

Deciding the interface by consultation is waste of time. The interface can be standardized by the present invention, by which the development period and costs for the software and system can be reduced.

Installing an interface for each maker causes an increase in code size for implementing each process. By the present invention, the interface is standardized and such an increase in the code size can be avoided.

While an embodiment in accordance with the present invention has been described above, various modifications can be realized in regard to the above embodiment.

While the hardware I/F (K20) of the application in the above embodiment is configured to acquire information from the inside of the information device 10, the hardware I/F (K20) may also be configured to acquire information from an information device outside the information device 10. For example, when a cellular phone as the information device 10 is used as a terminal for controlling a home information appliance, the hardware I/F (K20) makes access to the home information appliance via a wired or wireless network (via the network interface 9) and acquires the device internal information of the home information appliance according to a request from the data analysis (K41).

As another example, a cellular phone as the information device 10 may acquire information from a vehicle-mounted device. In this case, the hardware I/F (K20) implemented in the cellular phone communicates with the vehicle-mounted device via wireless communication (infrared data communication, wireless LAN, etc.) and acquires the device internal information of the vehicle-mounted device (e.g. the remaining amount of fuel).

The hardware I/F (K20) may also be configured to acquire device internal information from an information device connected via the Internet.

When there are a plurality of information devices as the targets of management of the device internal information, the data analysis (K41) holds a tree of device internal information (like the one shown in FIG. 4) regarding each information device while generating the layout tree for each information device.

While the functions of the hardware I/F (K20) on the application side (block B) and the functions on the browser side (block A) are both implemented in one information device 10 in the above embodiment as shown in FIG. 1, these functions are not necessarily required to be implemented in only one information device. For example, the functions on the application side (block B) and those on the browser side (block A) may be provided in different terminal devices, implementing the functional blocks shown in FIG. 1 as a system.

What is claimed is:

1. A device information displaying system for displaying device internal information of one or more information devices, comprising:
   a memory for storing computer-readable instructions;
   a processor for executing the instructions, wherein the instructions, when executed, causes the processor to function as:
   (a) an information browser comprising:
      an acquisition unit which acquires document data described in a markup language;
      an analysis unit which analyses the acquired document data;
      a generation unit which generates a document-based layout tree containing layout information of the acquired document data based on result of the analysis; and
      a rendering unit which causes a display screen to make a display of the acquired document data based on the generated document-based layout tree; and
   (b) a device information provider comprising:
      an acquisition unit which acquires the device internal information of the one or more information devices, wherein the device internal information is not described in HTML, and
         wherein the one or more information devices are internal to the device information displaying system;
      a generation unit which generates a device-information-based layout tree containing layout information of the device internal information, wherein:
         the device-information-based layout tree is different from the acquired document data,
         the device-information-based layout tree is generated based on data corresponding to the type of the information device,
         the device-information-based layout tree has a hierarchical structure, the device-information-based layout tree comprising: information, at a first level of the hierarchical structure, representing the type of an information device of the one or more information devices; and information, at a second level of the hierarchical structure, representing peripheral devices of the information device of the one or more information devices, the first level different from the second level,
         the device-information-based layout tree is not analyzed by the analysis unit that analyzed the acquired document data, and
         the device-information-based layout tree is not generated by the generation unit that generated the document-based layout tree; and
      a providing unit which provides the generated device-information-based layout tree to the rendering unit of the information browser without creating a markup language document,
      wherein the rendering unit further causes the display screen to make a display of the device internal information based on the device-information-based layout tree provided from the providing unit of the device information provider, without creating a markup language document.

2. The device information displaying system according to claim 1, wherein the data corresponding to the type of the information device is stylized data.

3. The device information displaying system according to claim 2, wherein the stylized data are prepared in multiple types corresponding to the types of the information devices.

4. The device information displaying system according to claim 1, wherein the device information provider further has a function of writing operation information, including at least one of setting information and a control instruction, into the one or more information devices.

5. The device information displaying system according to claim 4, wherein the device information provider includes a device information interface which functions as an interface for receiving a request signal according to a prescribed procedure and executing the acquisition of the device internal information from the one or more information devices and the writing of the operation information according to the request signal.

6. The device information displaying system according to claim 5, wherein:
   the information browser and the device information provider are implemented in one information device, and
   the device information interface acquires the device internal information of the one information device.

7. The device information displaying system according to claim 5, wherein the device information interface is connected to the one or more information devices via a wired and/or wireless network and acquires the device internal information from the one or more information devices via the network.

8. The device information displaying system according to claim 1, wherein the one or more information devices include at least one of a cellular phone, a home information appliance and a vehicle-mounted device.

9. The device information displaying system according to claim 1, wherein the device internal information includes at least one of information on the types of the information devices and information on peripheral devices of each of the one or more information devices.

10. A computer program product comprising a non-transitory computer-readable storage medium containing computer-readable instructions that cause a computer to function as:
(a) an information browser comprising:
an acquisition unit which acquires document data described in a markup language;
a generation unit which analyses the acquired document data;
an analysis unit which generates a document-based layout tree containing layout information of the acquired document data based on result of the analysis; and
a rendering unit which causes a display screen to make a display of the acquired document data based on the generated document-based layout tree; and
(b) a device information provider comprising:
an acquisition unit which acquires device internal information of one or more information devices, wherein the device internal information is not described in HTML, and
wherein the one or more information devices are internal to the device information displaying system;
a generation unit which generates a device-information-based layout tree containing layout information of the device internal information of the one or more information devices, wherein:
the device-information-based layout tree is different from the acquired document data,
the device-information-based layout tree is generated based on data corresponding to the type of the information device,
the device-information-based layout tree has a hierarchical structure, the device-information-based layout tree comprising: information, at a first level of the hierarchical structure, representing the type of an information device of the one or more information devices; and information, at a second level of the hierarchical structure, representing peripheral devices of the information device of the one or more information devices, the first level different from the second level,
the device-information-based layout tree is not analyzed by the analysis unit that analyzed the acquired document data, and
the device-information-based layout tree is not generated by the generation unit that generated the document-based layout tree; and
a providing unit which provides the generated device-information-based layout tree to the rendering unit of the information browser without creating a markup language document,
wherein the rendering unit further causes the display screen to make a display of the device internal information based on the device-information-based layout tree provided from the providing unit of the device information provider, without creating a markup language document.

11. The computer program product according to claim 10, wherein the data corresponding to the type of the information device is stylized data.

12. The computer program product according to claim 11, wherein the stylized data are prepared in multiple types corresponding to the types of the information devices.

13. The computer program product according to claim 10, wherein the device information provider further has a function of writing operation information, including at least one of setting information and a control instruction, into the one or more information devices.

14. The computer program product according to claim 13, wherein the device information provider includes a program interface which receives a request according to a prescribed procedure and executes the acquisition of the device internal information from the one or more information devices and the writing of the operation information according to the request.

15. The computer program product according to claim 14, wherein:
the information browser and the device information provider are implemented in one information device, and
the program interface acquires the device internal information of the one information device.

16. The computer program product according to claim 14, wherein the program interface is connected to the one or more information devices via a wired and/or wireless network enabling communication and acquires the device internal information from the one or more information devices via the network.

17. The computer program product according to claim 10, wherein the one or more information devices include at least one of a cellular phone, a home information appliance and a vehicle-mounted device.

18. The computer program product according to claim 10, wherein the device internal information includes at least one of information on the types of the information devices and information on peripheral devices of each of the one or more information devices.

19. An information browser program product comprising a non-transitory computer-readable storage medium containing computer-readable instructions that cause a computer to execute the functions of:
acquiring document data described in a markup language;
acquiring device internal information of one or more devices, wherein the device internal information is not described in HTML, and
wherein the one or more information devices are internal to the device information displaying system;
analyzing the markup language structure of the acquired document data;
generating a document-based layout tree containing layout information of the acquired document data based on the result of the analysis;
generating a device-information-based layout tree containing layout information of the acquired device internal information without creating a markup language document, wherein:
the device-information-based layout tree is different from the acquired document data,
the device-information-based layout tree is generated based on data corresponding to the type of the information device,
the device-information-based layout tree has a hierarchical structure, the device-information-based layout tree comprising: information, at a first level of the hierarchical structure, representing the type of an information device of the one or more information devices; and information, at a second level of the hierarchical structure, representing peripheral devices of the information device of the one or more information devices, the first level different from the second level, the device-information-based layout tree is not analyzed by the instructions that analyzed the acquired document data, and the device-information-based layout tree is not generated by the instructions that generated the document-based layout tree;

rendering, for display on a display screen, the acquired document data based on the generated document-based layout tree; and rendering, for display on the display screen, the acquired device internal information based on the generated device-information-based layout tree, without creating a markup language document.

\* \* \* \* \*